2,844,622
KETENE REACTIONS

Gene J. Fisher, Corpus Christi, Tex., assignor to Celanese Corporation of America, New York, N. Y., a corporation of Delaware No Drawing. Application June 28, 1954
Serial No. 439,927

15 Claims. (Cl. 260—486)

This invention relates to ketene reactions and relates more particularly to the reactions of a ketene and an aldehyde.

It is an object of this invention to provide a new process for carrying out the reaction of an aldehyde and a ketene.

A further object of this invention is the provision of a novel and efficient process for the production of esters of unsaturated acids.

Another object of this invention is to provide a new process for the preparation of acrylates.

Other objects of this invention will be apparent from the following detailed description and claims.

In accordance with this invention a ketene and an aldehyde are reacted in the vapor phase at an elevated temperature. The reaction products, at least one of which contains the acyl radical of an alpha-ethylenically unsaturated carboxylic acid, are then mixed with an alcohol and reacted therewith, preferably in the presence of an esterification catalyst, to produce an ester of said unsaturated acid.

In the practice of the present invention, best results are obtained when the materials reacting in the vapor phase are formaldehyde and ketene, per se. Examples of the other aldehydes which may be reacted with ketenes in the vapor phase in accordance with this invention are acetaldehyde, propionaldehyde, butyraldehyde, valeraldehyde, benzaldehyde, furfural, acrolein and crotonaldehyde. Examples of other ketenes which may be reacted with formaldehyde or other aldehydes in accordance with this invention are methyl ketene, ethyl ketene, benzyl ketene, phenyl ketene, dimethylketene and diethylketene. It is desirable, of course, to employ aldehydes and ketenes whose substituents, if any, do not materially interfere with the course of the reaction.

The reaction between the ketene and the aldehyde in the vapor phase is advantageously carried out in the presence of a Friedel-Crafts catalyst, best results being obtained when vapors of a volatile Friedel-Crafts catalyst are present in the reaction mixture. Examples of suitable volatile Friedel-Crafts catalysts are boron trifluoride, titanium tetrachloride, aluminum chloride, ferric chloride and other volatile halides, e. g. chlorides, bromides, fluorides of boron, aluminum, ferric iron, stannic tin, titanium or arsenic.

In one convenient method of carrying out the reaction between the ketene and the aldehyde, these two reactants are fed continuously to a heated reaction zone having a temperature of above about 100° C., preferably between 100 and 300° C., optimum results being obtained at temperatures of about 250 to 260° C. The proportions of the reactants fed to the reaction zone may be varied widely, although best results are obtained when there is used at least one mole, preferably 1 to 3 moles, of ketene per mole of aldehyde. It is desirable to mix a stream of an inert diluent gas with the reactants in order to promote mixing thereof and also to serve as a diluent and inhibit any tendency for the gaseous reactants to polymerize. Advantageously, the volatile Friedel-Crafts catalyst is injected continuously into the heated mixture of reactants in said reaction zone. In order to minimize decomposition high local concentrations of catalyst in the reaction mixture should be avoided. To this end it is advantageous to carry out the mixing of the catalyst and the hot reactants in as short a time as possible. Such rapid mixing is conveniently effected by injecting with the catalyst a side stream of the inert diluent gas. It is also convenient to inject the catalyst in the form of a solution thereof in a volatile solvent, such as pentane or diethyl ether, which is substantially inert or has no adverse effect on the reaction. It is desirable to carry out the reaction under substantially anhydrous conditions, since any water present in effect decreases the amount of ketene available for reaction with the aldehyde. If desired, the reaction zone may be packed with any suitable material, e. g. beads, helices, rings or saddles of glass, or ceramic packing. However, I have not found that the use of packing affords any improvement in yields. In fact, the presence of packing often tends to promote carbonization. Accordingly, an unpacked reaction zone is preferred.

The concentration of catalyst in the reaction zone may be varied as desired, suitable proportions being, for example, 5 to 20 mole percent, based on the formaldehyde. The time of contact between the catalyst and the heated reaction mixture is advantageously relatively low. For example, the space velocity, calculated on the basis of the volumes of gases fed corrected to reaction conditions, assuming the reactants to behave as ideal gases, is advantageously above about 200 hour$^{-1}$, preferably about 700 to 1000 hour$^{-1}$.

The composition of the gaseous reaction products emerging from the reaction zone is not known precisely. However, experimental evidence indicates that the acyl radical of the α-ethylenically unsaturated monocarboxylic acid is present, at least in part, in an anhydride of such acid. Thus, when the reactants are formaldehyde and ketene a considerable proportion of acetic acrylic anhydride is found in the gaseous reaction products.

As indicated previously, the products of the reaction of the aldehyde and ketene are mixed with an alcohol. In the preferred embodiment of this invention the hot gaseous reaction products emerging from the reaction zone are quenched, i. e. partially cooled and liquefied, by bringing them into contact with a liquid alcohol. If desired, other methods of mixing the gaseous reaction products and the alcohol may be employed. Thus, the alcohol may be vaporized into the stream of hot reaction gases, but the yields obtained by operating in this manner are lower than those resulting from the quenching procedure. Although the reasons for this difference are not clearly understood, it appears that the method using injecting of the alcohol vapors tends to favor the undesired alcoholation of the ethylenic double bonds of the reaction products. In either method there may also be injected, if desired, an agent for neutralizing the Friedel-Crafts catalyst, such as triethylamine. The choice of the particular alcohol for use in the practice of this invention depends, of course, on which ester is desired as the final product. Examples of suitable alcohols are methanol, ethanol, propanol, butanol, decanol, benzyl alcohol, ethylene glycol, diethylene glycol, glycerol, pentaerythritol and 2-ethylhexanol.

The mixture of the alcohol and the reaction products of the ketene-aldehyde reaction is subjected to esterification conditions to produce the desired ester of the alpha-ethylenically unsaturated carboxylic acid. In a preferred form of this invention, an esterification catalyst, e. g.

sulfuric acid, p-toluene sulfonic acid, benzenesulfonic acid or hydrochloric acid, is added to this mixture and the mixture is distilled to evaporate off the resulting ester. Other esterification procedures may be employed, if desired, in a manner well known to the art.

The following examples are given to illustrate this invention further.

*Example I*

A mixture of 3 moles of ketene and 1 mole of substantially anhydrous formaldehyde, together with nitrogen as a diluent, is passed continuously in a downward direction through a vertical tube maintained at a temperature of 250 to 260° C. A 12% solution of boron trifluoride in diethyl ether is injected continuously, together with further quantities of nitrogen, into the heated reactants flowing through the tube at a point on the tube near the inlet for the reactants. The boron trifluoride solution is supplied at the rate of 1 mole of $BF_3$ per 9.4 moles of formaldehyde, while the amount of nitrogen fed in with the reactants and the catalyst is 71 liters (measured at atmospheric pressure at 20 to 23° C.) per mole of formaldehyde. The space velocity, calculated on the basis of volumes of gases fed corrected to reaction conditions, assuming the reactants to behave as ideal gases, is 850 hour$^{-1}$. The gaseous stream of heated reaction products emerging from the tube is quenched by bringing it into contact with a continuous stream of liquid methanol, supplied at a temperature of 20 to 25° C. and in an amount of 1½ moles per mole of ketene fed, and the resulting mixture is cooled to 0 to 5° C. in a packed condenser and then passed to a separator where uncondensed gases are allowed to leave the mixture. These uncondensed gases are scrubbed by passing them through glacial acetic acid to recover excess ketene and volatile by-products therefrom.

To the mixture of quenched reaction products and methanol there is added 5%, based on the weight of the mixture, of concentrated sulfuric acid and the resulting acidic mixture is distilled at atmospheric pressure. The methyl acrylate content of the distillate represents a yield of methyl acrylate of 69%, based on the amount of formaldehyde supplied, and an efficiency of conversion to methyl acrylate of 75% based on formaldehyde and 68% based on ketene.

*Example II*

Example I is repeated except that the keteneformaldehyde molar ratio in the feed is 2.39:1, the boron trifluoride:formaldehyde molar ratio is 1:10.1, and the space velocity is 770 hour$^{-1}$. The yield of methyl acrylate is 65% based on the formaldehyde supplied and the efficiency of conversion to methyl acrylate is 72% based on formaldehyde and 64% based on ketene.

*Example III*

Example I is repeated except that n-butanol is substituted for the methanol, the molar ratio of ketene to formaldehyde is 2.07:1, the molar ratio of boron trifluoride to formaldehyde is 1:10, the amount of nitrogen is about 61 liters per mole of formaldehyde, and the space velocity is 250 hour$^{-1}$. The yield of butyl acrylate is 44% based on the formaldehyde supplied and the efficiency of conversion to butyl acrylate is 44% based on formaldehyde and 40% based on ketene.

It is to be understood that the foregoing detailed description is given merely by way of illustration and that many variations may be made therein without departing from the spirit of my invention.

Having described my invention, what I desire to secure by Letters Patent is:

1. Process which comprises reacting ketene and formaldehyde by continuously contacting said reactants in the vapor phase at a temperature of above about 100° C. in the presence of a Friedel-Crafts catalyst to produce a gaseous reaction product containing the acryly radical.

2. Process as set forth in claim 1, in which Friedel-Crafts catalyst is volatile.

3. Process as set forth in claim 2 in which said Friedel-Crafts catalyst is boron fluoride and said temperature is about 250–260° C.

4. Process as set forth in claim 1 in which said temperature is 100–300° C. and the mole ratio of ketene to formaldehyde is 1–3:1.

5. Process which comprises reacting ketene and formaldehyde by continuously contacting said reactants in the vapor phase at a temperature of above about 100° C. to produce a gaseous reaction product containing the acryly radical, and quenching said reaction product in a liquid alcohol.

6. Process as set forth in claim 5 in which said alcohol is a lower alkanol.

7. Process as set forth in claim 5 in which said ketene and formaldehyde are reacted in the presence of a Friedel-Crafts catalyst.

8. Process as set forth in claim 7 in which Friedel-Crafts catalyst is volatile and said temperature is 100–300° C.

9. Process as set forth in claim 7 in which said Friedel-Crafts catalyst is boron fluoride and said temperature is about 250–260° C.

10. Process as set forth in claim 9 in which the resulting liquid mixture of alcohol and reaction product is heated in the presence of an esterification catalyst to produce an acrylic ester of said alcohol.

11. Process as set forth in claim 10 in which the reaction between the ketene and formaldehyde is carried out in the presence of an inert diluent gas, and in which the alcohol is a lower alkanol.

12. Process as set forth in claim 5 in which the resulting liquid mixture of alcohol and reaction product is heated in the presence of an esterification catalyst to produce an acrylic ester of said alcohol.

13. Process as set forth in claim 12 in which said alcohol is a lower alkanol.

14. Process which comprises reacting ketene and formaldehyde by continuously contacting said reactants in the vapor phase at a temperature of above about 100° C. to produce a gaseous reaction product containing the acrylyl radical, mixing the reaction product with a liquid alcohol and esterifying the reaction product with said alcohol, in liquid phase.

15. Process as set forth in claim 14 in which said alcohol is a lower alkanol.

References Cited in the file of this patent

UNITED STATES PATENTS

| | | |
|---|---|---|
| 2,450,116 | Caldwell | Sept. 28, 1948 |
| 2,466,501 | Steadman et al. | Apr. 5, 1949 |
| 2,734,074 | Redmon | Feb. 7, 1956 |

OTHER REFERENCES

Hurd et al.: J. Am. Chem. Soc., vol. 55 (1933), pages 275–83.

Caldwell: Abstract Serial No. 252,194, published August 18, 1953, 673 O. G. 839.